United States Patent [19]
Dissinger

[11] 3,883,181
[45] May 13, 1975

[54] DECORATIVE WHEEL COVER AND RETAINING ASSEMBLY THEREFOR

[75] Inventor: William K. Dissinger, Muncy, Pa.

[73] Assignee: Plastaspec, Inc., Harrisburg, Pa.

[22] Filed: Apr. 5, 1972

[21] Appl. No.: 241,303

[52] U.S. Cl............................ 301/37 P; 301/108 R
[51] Int. Cl................................................ B60b 7/00
[58] Field of Search..... 301/37 P, 37, 108 R, 108 A

[56] References Cited
UNITED STATES PATENTS

| 2,657,099 | 10/1953 | Judd | 301/37 P |
| 2,695,195 | 11/1954 | O'Day | 301/108 R |
| 2,902,316 | 9/1959 | Black | 301/37 P |
| 3,265,441 | 8/1966 | Baldwin | 301/37 P |
| 3,671,076 | 6/1972 | Aske | 301/37 P |

FOREIGN PATENTS OR APPLICATIONS 1,075,709    7/1967   United Kingdom............ 301/108 A Primary Examiner—Philip Goodman
Attorney, Agent, or Firm—Anthony A. O'Brien

[57] ABSTRACT

Wheel covers constructed of rigid, resilient thermoplastic materials and having a decorative display portion terminating at an annular recessed ledge from which a skirt depends having an attaching lip at the lower peripheral edge thereof for securing the wheel cover to a wheel assembly of a vehicle. A wheel cover assembly including a retaining assembly having a strap interconnecting the above described wheel cover with the wheel assembly of a vehicle to prevent inadvertent loss of the wheel cover.

13 Claims, 13 Drawing Figures

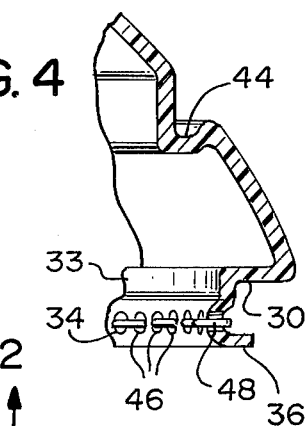
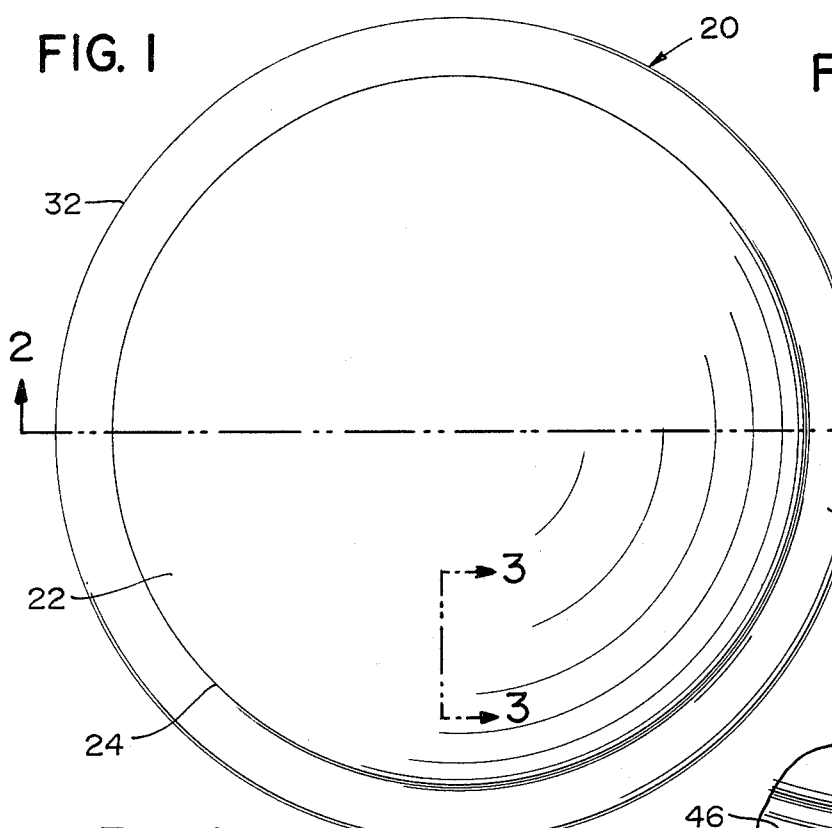
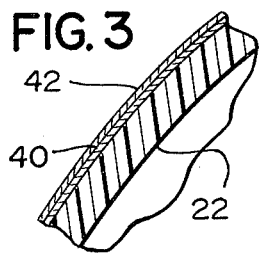
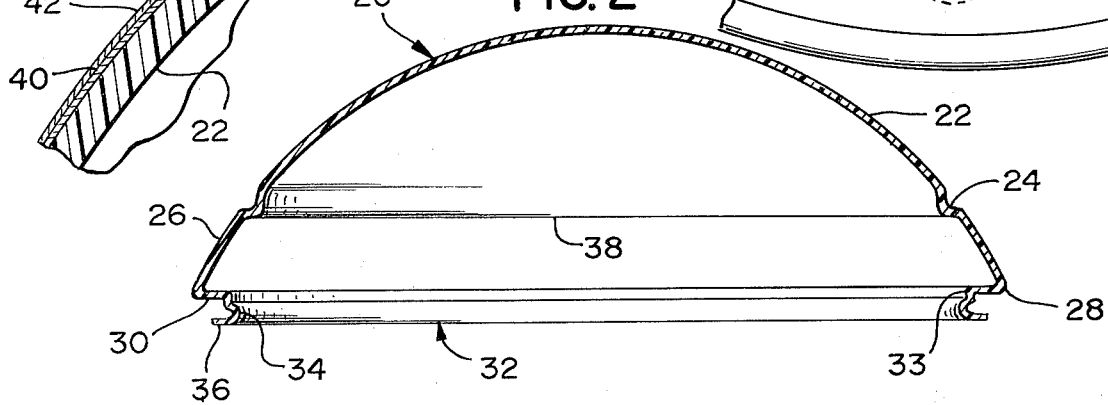
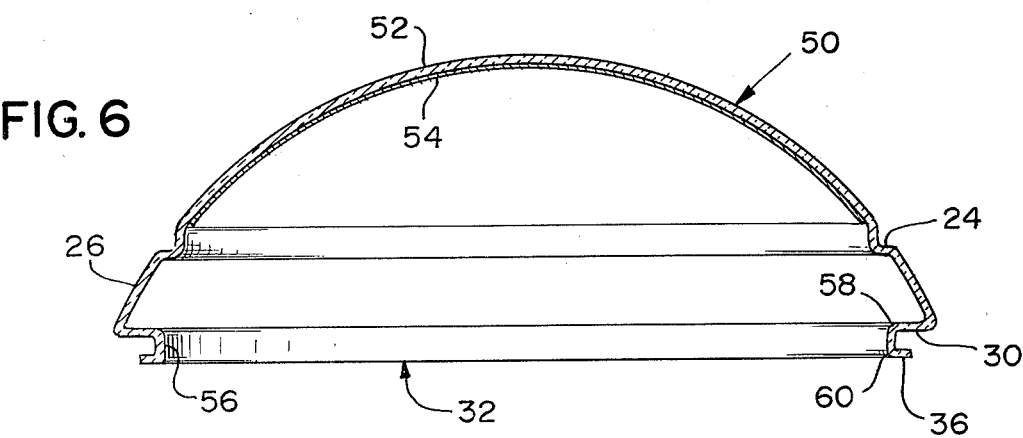

DECORATIVE WHEEL COVER AND RETAINING ASSEMBLY THEREFOR

BACKGROUND OF THE INVENTION

1. Field of the Invention:

The present invention pertains to wheel covers and, more particularly, to decorative wheel covers constructed of a rigid, resilient thermoplastic material for mounting on a wheel assembly of a vehicle and a retaining assembly interconnecting the decorative wheel cover with a wheel assembly of a vehicle.

2. Discussion of the Prior Art

The cost of conventional as well as specially designed members for covering either a substantial part of the wheel of a vehicle or a hub portion thereof is extremely high in that such wheel covers are made of metal which increases material costs as well as the costs involved in providing suitable indicia or displays on the cover members.

Metal wheel covers are not easily decorated in such a manner as to prevent the decorative matter from deteriorating, such as the peeling of paint therefrom, and this represents a substantial problem in that wheel covers are subjected to an environment which tends to cause quick deterioration of the surface thereof. That is, cover members for wheel assemblies of vehicles are subjected to substantial heat due to the heat conduction of the metal cover member 1 are hit by various loose objects such as stones and gravel, and are subjected to forceful contact with immovable objects.

SUMMARY OF THE INVENTION

Accordingly, it is an object of the present invention to provide a decorative wheel cover that may be inexpensively produced while maintaining aesthetic appeal and having substantial resistance to wear.

The present invention is generally characterized by a decorative wheel cover for mounting on a wheel assembly of a vehicle including a display portion carrying a decorative material, a skirt portion depending from the display portion, and a lip portion extending from the bottom peripheral edge of the display portion and having an annular bead extending radially, inwardly toward the center of the wheel cover, the display, skirt and lip portions being integrally formed of rigid, resilient thermoplastic material. The present invention is further generally characterized in a retaining assembly for interconnecting the above described decorative wheel cover with a wheel assembly of a vehicle including a strap adapted to be detachably secured to the wheel assembly.

Another object of the present invention is to form a decorative wheel cover of a rigid, resilient thermoplastic material having a lip with an inwardly, radially directed, continuous bead therearound for mounting on the wheel assembly of a vehicle.

A further object of the present invention is to provide a decorative wheel cover made of a rigid, resilient thermoplastic material with an annular retaining ledge to strengthen the wheel cover, provide a retaining support for paint masks and insulate flexing of a display portion on one side of the ledge from a skirt portion on the other side of the ledge.

The present invention has another object in that a decorative wheel cover formed of a rigid, resilient thermoplastic material has multiple superposed layers decorative material thereon to provide an aesthetically pleasing effect and reduce light absorption by the thermoplastic material.

Some of the advantages of the decorative wheel cover of the present invention over prior art wheel covers are that the decorative wheel covers are not easily permanently damaged or dented due to the resilient nature thereof, that the decorative material carried by the decorative wheel covers does not easily deteriorate either due to contact with objects or due to thermal conditions, and that the decorative wheel covers are securely mounted on wheel assemblies of vehicles due to the insulation of flexing of the display portion from the skirt and lip portions of the wheel covers.

Other objects and advantages of the present invention will become apparent from the following description of the preferred embodiments taken in conjunction with the accompanying drawings.

BRIEF DESCRIPTION OF THE DRAWINGS

FIG. 1 is a plan view of a wheel cover in accordance with the present invention.

FIG. 2 is a section taken along line 2—2 of FIG. 1.

FIG. 3 is a section taken along line 3—3 of FIG. 1.

FIG. 4 is a fragmentary elevation of a modification of the wheel cover of FIGS. 1 and 2.

FIG. 5 is a fragmentary bottom plan view of the modification of FIG. 4.

FIG. 6 is an elevation section of another embodiment of the wheel cover of the present invention.

DESCRIPTION OF THE PREFERRED EMBODIMENTS

Figure 7:
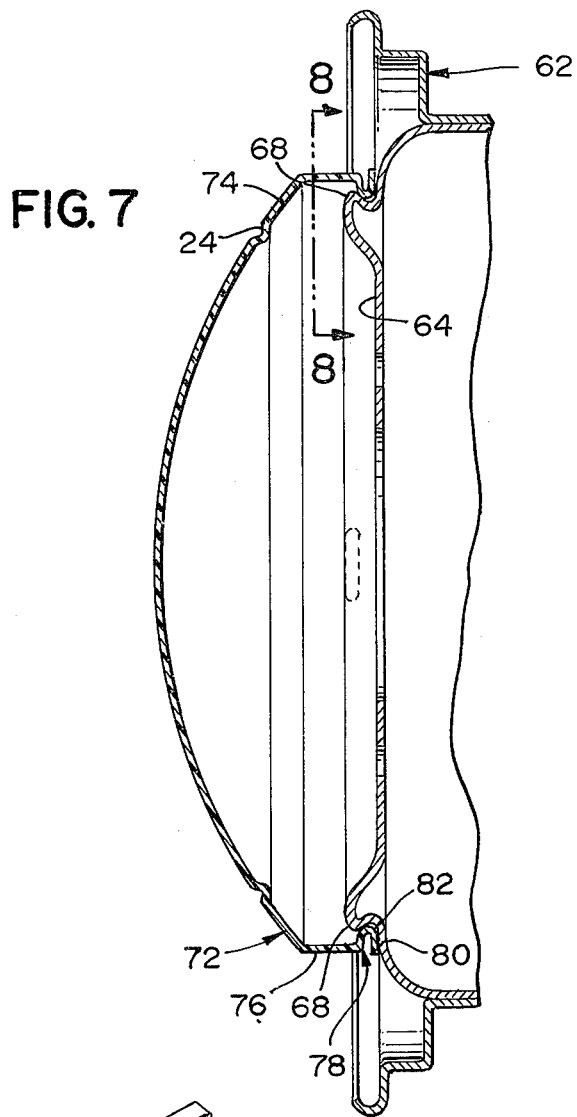
FIG. 7 is a side elevation with parts in section of a further embodiment of the wheel cover of the present invention mounted on the wheel cover assembly of a vehicle.

The wheel covers and wheel cover assembly according to the present invention may be utilized with automobiles or other passenger vehicles; and, for illustrative purposes, the present invention will hereinafter be described for use with wheel assemblies of automobiles. The terms "wheel cover" as utilized herein is meant to include all members adapted to cover parts of a wheel assembly of a vehicle, particularly including members adapted to cover just the hub portion of such wheel assemblies and members adapted to cover both the hub portion and a predominant portion of the wheels of such wheel assemblies.

A wheel cover 20 according to the present invention is illustrated in FIGS. 1 and 2 and is integrally formed with a domed display portion 22 terminating at its lower peripheral edge at an annular recessed ledge 24.

A skirt 26 depends from ledge 24 and is offset at a lower peripheral edge 28 to form a shoulder 30 that terminates in a lip generally indicated at 32 including an annular wall 33 depending from shoulder 30, an inwardly directed arcuate bead 34 extending from wall 33 and an outwardly extending flange 36 arranged generally parallel to shoulder 30 such that shoulder 30 extends radially outwardly beyond lip 32.

Annular ledge 24 is recessed in the exterior surface of the wheel cover and forms a strengthening rib 38 protruding internally of the wheel cover, and the ledge 24 provides a retaining surface to provide for interchangeability of masks utilized to provide superposed layers of paint on the wheel cover. The configuration of the annular lege 24 also serves to insulate flexing of the domed display portion 22 from skirt 26 and the lip 32 such that deformation of the display portion due to a force applied thereto does not cause a similar deformation of the skirt and rib thereby preventing inadvertent detachment of the wheel cover from a wheel assembly.

As best shown in FIG. 3, the exterior surface of the wheel cover has a layer of decorative material such as paint thereon, advantageously at least two such superposed layers 40 and 42 of different colors. The masks utilized to provide patterns for each color layer of paint to be placed on the wheel cover are positioned on retaining ledge 24 in order that the masks may be utilized for wheel covers of varying sizes. An indexing indent 44, as shown in FIG. 4 in the form of a rectangular recess in ledge 24, is utilized to provide proper rotational alignment of the paint masks utilized to provide multicolored designs on the wheel cover.

The wheel cover 20 is integrally formed of a rigid, resilient thermoplastic or thermosetting resin including for example polyolefins, such as polyethylene, polypropylene and block and random copolymers of ethylene and propylene; polyvinyl chloride; polyvanylidine chloride; polystyrene; polycarbonates; and polyamides, e.g., nylon 6, nylon 610, nylon 11, nylon 12, etc. The desired configuration for the wheel cover may be produced in any conventional manner such as for instance by a molding process with the layers of paint 40 and 42 being supplied to the rigid, resilient thermoplastic material either prior to molding or shaping or thereafter.

The rigid, resilient thermoplastic material utilized to form the wheel cover 20 is desirably opaque in order to enhance the effect of the decorative material thereon, and deleterious heat build-up within the thermoplastic material is prevented by the decorative material. That is, the layers of paint or other decorative material serve to reflect light rays to thereby reduce the absorption of such rays by the thermoplastic material.

A modification of the wheel cover of FIGS. 1 and 2 is illustrated in FIGS. 4 and 5 and includes, along with indexing indent 44, a plurality of apertures 46 disposed in bead 34 and a wire 48 interwoven between the apertures 46 in order to enhance securement of the wheel cover to a wheel assembly and to increase the resiliency of the lip 32 thereof. The wire 48 may be of various gauges dependent upon the size of the wheel cover and the configuration of the wheel assembly on which the wheel cover is to be mounted.

Another embodiment of the wheel cover of the present invention is illustrated in FIG. 6 with the thermoplastic wheel cover, generally indicated at 50, being transparent or translucent to permit light rays to pass therethrough. In this particular illustration, at least the domed display portion 52 is transparent and decorative material 54 is applied to the interior surface of the wheel cover to display any desired design, pattern, promotion, advertisement, etc.

The decorative material is in the form of a decal, a paint application or any type of plating application such as vacuum metalizing on the interior surface of the wheel cover; in addition, the decorative material may be applied to entire interior surface of the wheel cover. Placing the decorative material on the interior surface of the wheel cover has the particular advantage that rubbing and/or scratching on the exterior surface does not damage the decorative design.

The wheel cover 50 is integrally formed of a rigid, resilient, transparent thermoplastic material and has the advantage that rays of light pass through the plastic without creating deleterious heat therein. The decorative material will absorb such rays without any adverse effect. Parts of the wheel cover 50 which are identical to parts of the wheel cover 20 are given identical reference numbers and are not described again.

The wheel cover 50 of FIG. 6 also differs from wheel cover 20 in that the lip 32 therefor has a flat bead 56 formed therein extending slightly inwardly from an inner edge 58 to an outer edge 60 such that outer edge 60 has a smaller diameter than inner edge 58. The configuration of the lip on wheel cover 50 is particularly adapted to enhance securement to wheels having spring members bent upon themselves to hold wheel covers in place.

Figure 8:
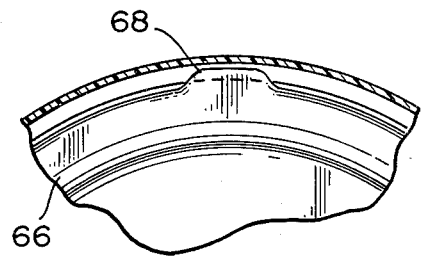
FIG. 8 is a fragmentary front elevation of the wheel assembly of FIG. 7 taken along line 8—8.

A further embodiment of a wheel cover according to the present invention is illustrated in FIG. 7 mounted on a wheel assembly including, as is conventional, a wheel 64 adapted to have a rubber tire mounted thereon with the sealing beads of the tire engaging the rim flanges of the wheel. The wheel 62 has a hub plate 64 with a central aperture therein to receive an axle (not shown), and the wheel 62 is adapted to be secured to the axle through spaced apertures in the hub plate 64. An annular rib 66 projects outwardly from the periphery of hub plate 64 and has four equally spaced lugs 68 formed thereon. As illustrated in FIG. 8, the lugs 68 have a lip extending radially, outwardly to define a recess thereunder for capturing the lip of the wheel cover. The specific configuration of the wheel assembly varies according to the type of vehicle on which it is mounted and the wheel covers of the present invention may be utilized with any such configurations.

The wheel cover is generally indicated at 70 and parts of the wheel cover 70 identical to parts of wheel cover 20 are given identical reference numbers and are not described again. The wheel cover 70 has a skirt 72 composed of a frusto-conical portion 74 extending from ledge 24 to a cylindrical wall 76 which terminates at its bottom peripheral edge at a lip 78 having a radially, inwardly directed wall 80 folded upon itself to form an arcuate bead 82.

Wheel cover 70 is mounted on the wheel assembly with the bead 82 extending within the recesses formed by the lips of lubs 68, and the mounting of the wheel cover 70 is facilitated by the resilient nature of the plastic material of the wheel cover. Accordingly, in order to mount the wheel cover 70, one portion of bead 82 82 is properly positioned with one of the lugs 68 and thereafter a force applied to the wheel cover will cause the wheel cover to distort due to the resiliency of the plastic material and permit the wheel cover to snap into place.

Figure 9:
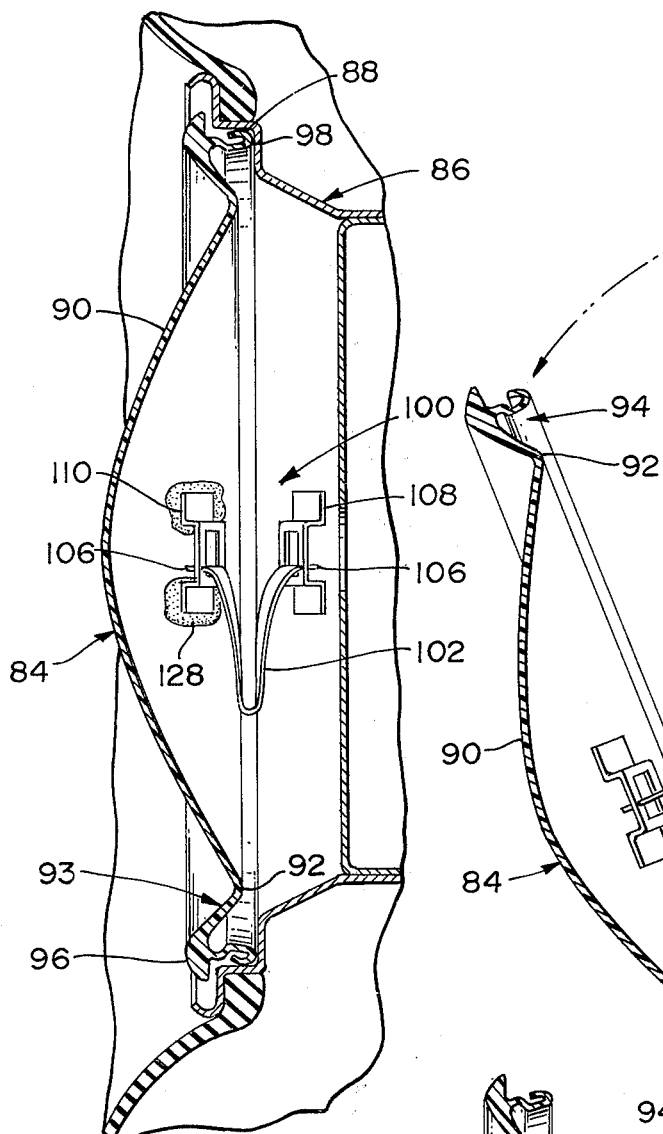
FIG. 9 is a side elevation with parts in section of a further embodiment of a wheel cover according to the present invention mounted on the wheel assembly of a vehicle.
Figure 10:
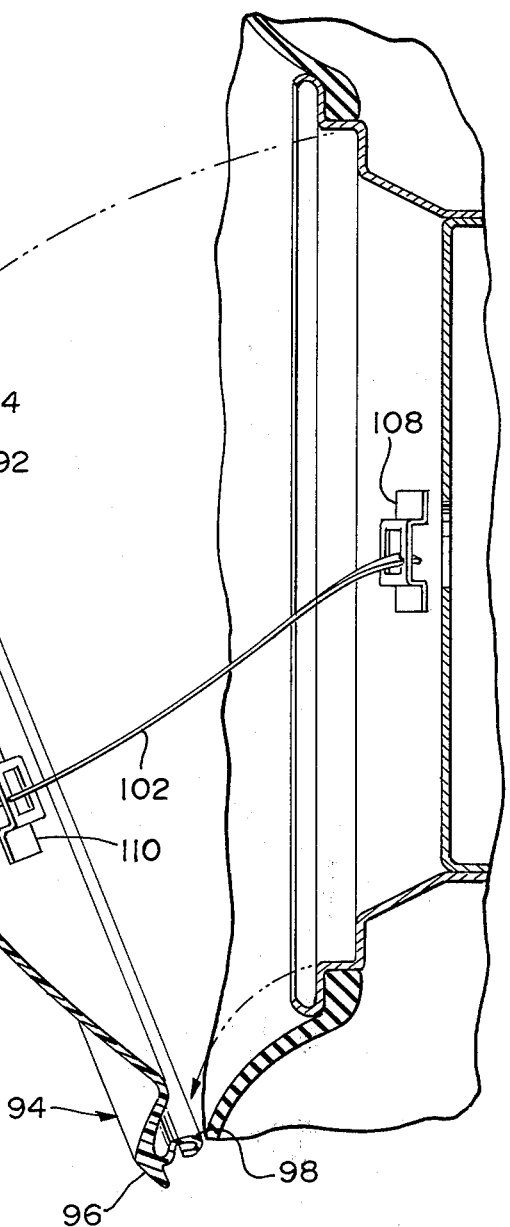
FIG. 10 is a side elevation with parts in section of the wheel cover of FIG. 9 displaced from the wheel assembly.

A wheel cover assembly according to the present invention is illustrated in FIGS. 9 and 10 including another embodiment of a wheel cover according to the present invention. The wheel cover, indicated generally at 84, is of the type adapted to cover a substantial portion of a wheel 86 which has an offset annular rim 88 for receiving the bead of a tire. The wheel cover 84 has a domed display portion 90 terminating at an annular deflection point 92 wherein the wheel cover is offset to define a skirt portion 93 extending upwardly and outwardly from the display portion in a V configuration. The skirt portion 93 terminates at an annular lip 94 having a thickened edge 96 and a bead 98 extending transversely from thickened edge 96 and folded back upon itself.

A retaining assembly generally indicated at 100 includes a strap 102 having slots 104 cut in the longitudinal edges adjacent each end thereof to define tabs 106. The retaining assembly 100 also includes a pair of locking members 108 and 110 secured to the hub plate of the wheel 86 and the interior surface of display portion 90 of wheel cover 84, respectively, by any suitable means. Locking members 108 and 110 are identical and each includes a rectangular slot 112, the dimensions of which are related to the dimensions of tabs 106 such that the tabs cannot be inserted within the slots other than angularly as will be explained hereinafter with respect to FIGS. 11 and 12. Since locking members 108 and 110 are identical, only locking members 108 will be described in detail with reference to FIGS. 11 and 12. Locking member 108 includes a pair of opposed flanges 114 and 116 which terminate at upstanding legs 118 and 120, respectively. The slot 112 is formed in a cross member 112 extending between legs 118 and 120 to define longitudinal arms 124 and 126 for the locking member. The legs 118 and 120 are of sufficient length to permit tab 106 to rest within slot 112.

Figure 11:
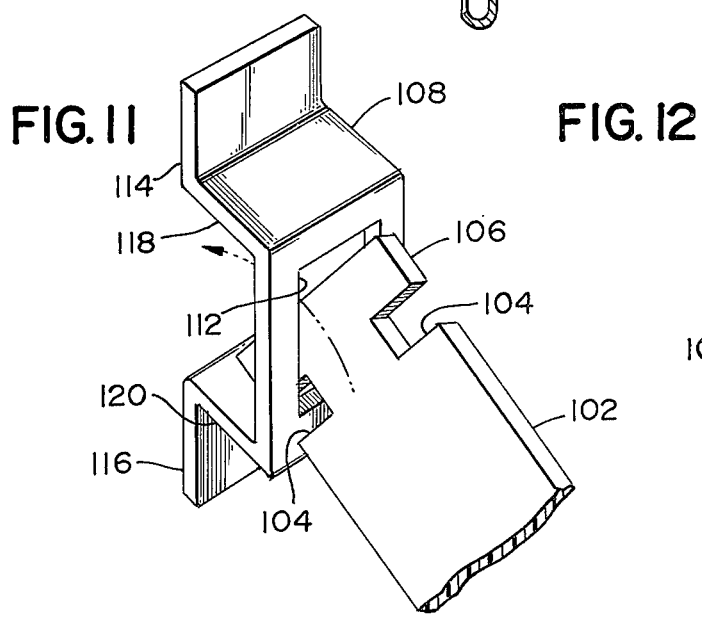
FIGS. 11 and 12 are perspective views illustrating the interlocking engagement of the retaining assembly of FIGS. 9 and 10.
Figure 12:
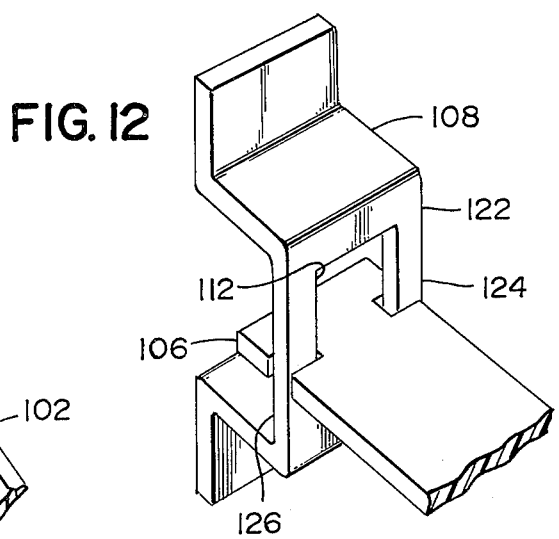

As shown in FIG. 11, the longitudinal dimension of tab 106 is greater than the diagonal dimension of the slot 112 as well as the length of slot 112 of locking member 108 such that the strap 102 may not be secured to the locking member by merely inserting the tab 106 therein with its width diagonally aligned or aligned with the length of slot 112. The only manner in which the strap 102 may be secured to the locking members 108 and 110 is by inserting the tab 106 in an angular fashion, aligned with the diagonal of the slot 112 such that one end of the tab precedes the other end of the tab as illustrated in FIG. 11. Once the tab 106 is inserted in the above manner, the slots 106 in the straps will receive the arms 124 and 126 of the locking member to securely hold the strap 102 in place as shown in FIG. 12.

The length of strap 102 should be sufficient to permit the wheel cover 84 to be removed from the wheel assembly; however, the length of the strap must be short enough to prevent the wheel cover from touching the surface upon which the vehicle is moving. That is, the length of the strap 102 is required to be sufficiently long to permit a person removing the wheel cover to insert a hand or a suitable tool between the wheel and the wheel cover to detach the strap 102 from the locking member 108; but, in practice, the length of the strap should be kept at a minimum to decrease vibratory movement of the wheel cover should it be inadvertently detached from the wheel assembly.

The locking member 110 may be integrally formed with the wheel cover 84 or may be secured thereto by any suitable means such as adhesive 128, as illustrated in FIG. 9. Similarly, the locking member 108 may be secured to the wheel 86 in any suitable manner and may be made of any desired material, preferably a material that can withstand the heat generated by the wheel during operation of the vehicle.

Figure 13:
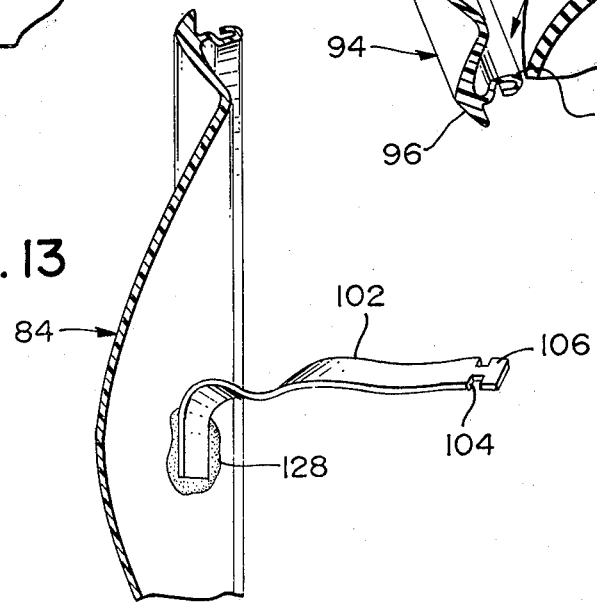
FIG. 13 is a fragmentary side elevation in section of a modification of the retaining assembly of FIGS. 9 and 10.

A modification of the retaining assembly is illustrated in FIG. 13 wherein strap 102 is illustrated as being permanently secured to wheel cover 70 by means of adhesive 128.

The various embodiments and modifications of the wheel cover and wheel cover assembly of the present invention, as described above, may be combined with each other in any desired manner. That is, the configuration of the lips of the wheel covers may be shaped in accordance with the construction of the wheel assembly on which they are to be mounted; and, similarly, any of the wheel covers may utilize the retaining assembly as well as the annular ledge 24, indexing indent 44, various display portion configurations, and either opaque or transparent rigid, resilient thermoplastic material. That is, the display portions may be domed, flat, convolute, or may have any desired configuration. Preferably, the wheel covers have multiple superposed layers of decorative material, such as paint or ink, thereon in order to permit such wheel covers to carry aesthetically pleasing designs as well as providing the function of preventing the absorption of heat by the thermoplastic material.

The unique structral configuration of the wheel covers of the present invention as above described permit the use of relatively light, rigid, resilient thermoplastic material for integrally forming the same in that the wheel covers can withstand impact from moving and stationary objects without suffering permanent damage or causing deterioration of the decorative material carried thereby. That is, the specific radially, inwardly directed lip structure along with the annular ledge permit the wheel covers of the present invention to be securely held in place on a wheel assembly of a vehicle thereby overcoming the problems resulting from merely substituting a plastic material for the metal material presently utilized in the manufacture of wheel covers.

Inasmuch as the present invention is subject to many variations, modifications and changes in detail, it is intended that all matter described above or shown in the accompanying drawings be interpreted as illustrative and not in a limiting sense.

What is claimed is:

1. A decorative wheel cover for mounting on a wheel assembly of a vehicle comprising a display portion; decorative means displayed by said display portion; a skirt portion depending from said display portion; and a lip portion extending from the bottom peripheral edge of said skirt portion and including an annular bead extending radially inwardly toward the center of said wheel cover; said display portion, said skirt portion and said lip portion being integrally formed of a resilient thermoplastic material whereby the wheel cover may be flexed to facilitate mounting, said material permitting passage of light rays therethrough, and said lip portion including a radially inwardly directed wall folded upon itself to form said bead, said bead having a curved surface configuration in cross section.

2. The decorative wheel cover as recited in claim 1 wherein said decorative means includes decal means displayed on the interior surface of said display portion.

3. The decorative wheel cover as recited in claim 1 wherein said decorative means includes a paint application displayed on the interior surface of said display portion.

4. The decorative wheel cover as recited in claim 1 wherein said decorative means includes a metallizing application displayed on the interior surface of said display portion.

5. The decorative wheel cover as recited in claim 1 wherein said decorative means is displayed on the exterior surface of said display portion.

6. The decorative wheel cover as recited in claim 1 and further comprising an annular ledge extending around said wheel cover and interconnecting said display portion and said skirt portion.

7. The decorative wheel cover as recited in claim 6 wherein said annular ledge is recessed in the exterior surface of said wheel cover to define an inwardly extending annular strengthening rib.

8. The decorative wheel cover as recited in claim 7, wherein said decorative means includes a plurality of superposed layers of different colored paint displayed on the exterior surface of said display portion, said display portion having a domed configuration.

9. A decorative wheel cover for mounting on a wheel assembly of a vehicle comprising a display portion having adorned configuration; decorative means displayed by said display portion said decorative means including a plurality of superposed layers of different colored paint displayed on the exterior surface of said display portion; a skirt portion depending from said display portion; and a lip portion extending from the bottom peripheral edge of said skirt portion and including an annular bead extending radially inwardly toward the center of said wheel cover; said display portion, said skirt portion and said lip portion being integrally formed of a thermoplastic material whereby the wheel cover may be flexed to facilitate mounting; and an annular ledge extending around said wheel cover and interconnecting said display portion and said skirt portion, said annular ledge being recessed in the exterior surface of said wheel cover to define an inwardly extending annular strengthening rib, and said annular ledge having indexing means indented therein.

10. A wheel cover assembly for mounting on a wheel assembly of a vehicle including a wheel for receiving a tire having a hub portion for attachment to an axle of the vehicle, the wheel cover assembly comprising;
   a decorative wheel cover including a display portion, a skirt portion depending from said display portion, and a lip portion extending from a bottom peripheral edge of said skirt portion and including an annular bead extending radially inwardly toward the center of said wheel cover, said display portion and said lip portion being integrally formed of a rigid, resilient thermoplastic material; and
   a retaining assembly including strap means secured to the interior surface of said wheel cover and locking means adapted to be secured to the hub portion of the wheel, said strap means carrying interlocking means on the free end thereof adapted to be detachably interlocked with said locking means, said locking means including a locking member having an elongated slot therein, said interlocking means including a tab having a longitudinal dimension greater than the longitudinal dimension of said slot whereby said tab must be diagonally aligned with said slot for insertion therein.

11. The wheel cover assembly as recited in claim 10 wherein said longitudinal dimension of said tab is greater than the diagonal dimension of said slot whereby said tab must be angularly oriented as well as diagonally aligned with said slot for insertion therein.

12. The wheel cover assembly as recited in claim 11 and further comprising an additional locking member carried on the interior surface of said wheel cover and having an elongated slot therein and said strap means carries an additional tab having a longitudinal dimension greater than the diagonal dimension of said slot of said additional locking member whereby said additional tab must be diagonally and angularly aligned with said slot of said additional locking member for insertion therein.

13. The wheel cover assembly as recited in claim 12 wherein said additional locking member is integrally formed with said wheel cover.

* * * * *